United States Patent Office 2,707,593
Patented May 3, 1955

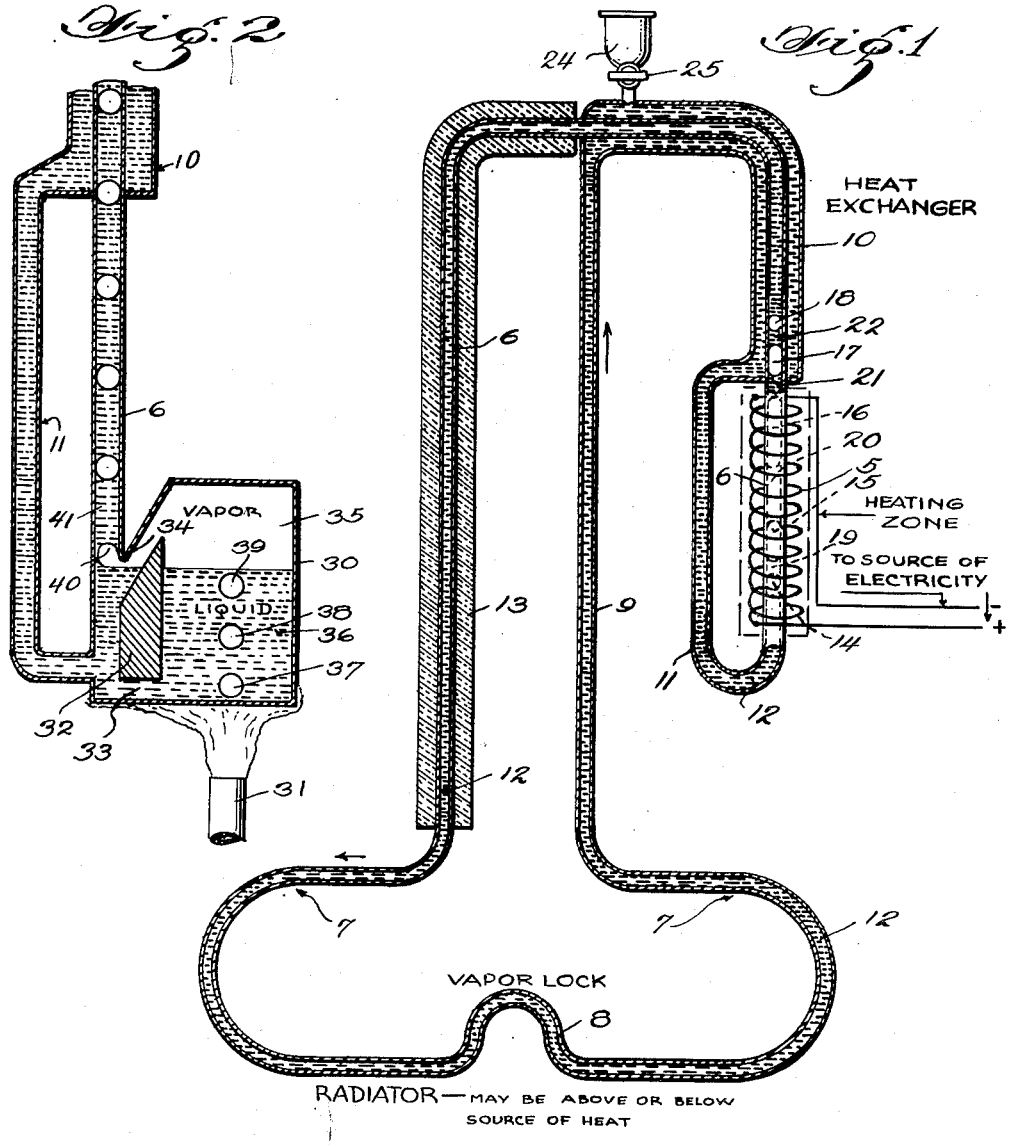

2,707,593

PHASE CHANGE CONVECTION SYSTEM

Alan H. Woodcock, Andover, Mass.

Application August 14, 1951, Serial No. 241,872

5 Claims. (Cl. 237—60)

(Granted under Title 35, U. S. Code (1952), sec. 266)

The invention described herein, if patented, may be manufactured and used by or for the Government for governmental purposes without the payment to me of any royalty thereon.

This invention relates to heat transfer systems and among other objects, aims to provide a close or continuous-circulation system characterized by a flow of the heating fluid which is much more rapid than that caused by convection. The system of my invention effects transfer of heat by a forced circulation arising from phase change of the heating fluid rather than by convection. A specific object is to provide a heating system which will force the heating fluid to flow through a closed or continuous-circulation system, hence may transfer heat to an area below the heat source, without recourse to pumps, valves or other mechanical agencies. A very specific object is to provide a small capacity heating system adaptable for heating casualty evacuation bags, which are used by the Army for warming patients' bodies while they are being transported to another place for medical attention. Other objects will be mentioned in the following specification or may be inferred therefrom by those skilled in the art.

In the accompanying drawings forming a part of this specification,

Fig. 1 is a diagram of apparatus embodying the invention; and

Fig. 2 is a diagram showing a different boiler arrangement for the apparatus of Fig. 1.

Referring to Fig. 1, the invention contemplates a system for the continuous circulation of a fluid, including a heat source 5, a hot tube or conduit 6 heated by and rising from the heat source, a radiator 7 connected to the hot tube 6 and having a vapor lock provided by a loop 8, a return conduit or tube 9 connected to the cool end of the radiator, a condenser or heat exchanger 10 above the heat source, and a second return conductor tube 11 coupling the heat exchanger with the cool end of the hot tube 6. The fluid is indicated at 12, and in the liquid or vapor phase it completely fills the system or, in other words, the system must be filled only with a liquid and its vapor. The liquid may be water, or an anti-freeze mixture of alcohol and water, or glycerine and water, or chloroform, or other liquids, solutions and mixtures. The source of heat is shown as an electric heating coil which surrounds the hot tube 6 and is connected with a source of electrical energy, not shown; but any other convenient source of heat may be used, for example, a gas, gasoline, alcohol or oil burner, a boiler, a steam coil, an exhaust pipe for an internal combustion engine or jet power plant, or a solar heater of the type described in Publication No. 3557 of the Smithsonian Institution, entitled "The Use of Solar Energy for Heating Water" by F. A. Brooks. Insulation 13 is shown surrounding the hot tube 6 and to minimize radiation and convection losses may envelop the heat source 5, also the heat exchanger, as will be understood without illustration.

Assuming that the described system employs tubing which is within a suitable range of sizes, and also assuming that the source of heat is of sufficient capacity, the liquid 12 is vaporized, forming bubbles 14, 15, 16, 17 and 18 which reach from wall to wall of the hot tube 6, the hot tube being sufficiently small to insure this result. The bubbles rise because they are lighter than the liquid; however, they do not float up through the liquid without moving it but lift the liquid in slugs, indicated at 19, 20, 21 and 22, which move upwardly into the heat exchanger or condenser 10 along with the bubbles. When the bubbles reach the heat exchanger, they are condensed to the liquid phase, yielding their heat of vaporization to the cooler liquid in the return side of the heat exchanger. Each liquid slug displaces its volume in the hot tube rising through the heat exchanger, and a circulation is set up in the closed system which forces the hot liquid to flow to the radiator, where heat is given up. However, due to the heat exchanger, the hot liquid reaching the radiator is far below the boiling point. The cool liquid is also forced to flow back to the heat exchanger, where it is preheated, which makes for higher efficiency, since less heat from the heat source is needed to bring the return-flowing liquid to the vapor phase. The flow of the liquid in the system under proper conditions will be steady or continuous, but may be pulsating if the liquid is superheated and forms bubbles suddenly.

It will be clear that circulation is forced and hence takes place regardless of the position of the radiator relative to the heat source. In ordinary hot water heating systems, the radiators must all be above the source of heat, flow of the heating water taking place solely because hot water rises and cool water sinks. The fact that with the described arrangement the radiator may be below the heat source makes it possible to heat rooms or objects below the heating zone. A practicable form of the described apparatus may be very useful as an auxiliary heating system to supplement a conventional heating installation, or it may heat a garage which cannot be heated by a conventional installation, or it may heat a house built without a cellar but with heating pipes in the floor (so-called radiant heating) and a boiler mounted on the floor and therefore above the radiator. The theoretical usefulness and adaptability of the system to solar heaters will be apparent without elaboration. Obviously a solar heater for houses is best exposed on a roof, where it is least likely to be shaded, yet a roof is always higher than the area or object which it is desired to heat. Furthermore, the system could be used to transmit solar energy below the ground level whenever the sun is shining, and the warmed soil would stimulate the growth of crops in the early spring. Also such energy could be used to warm the interiors of culverts sufficiently to obviate clogging by ice and snow, or to melt ice and snow accumulated in and near the culverts during a stormy period.

In operation, there may be periods when heat energy is no longer supplied. If such periods continue, the radiator may be hotter than the heating zone, and the liquid in the radiator will have a higher vapor pressure and vapor will form in the vapor lock 8, thus stopping circulation until sufficient heat is applied by the heat source to raise the temperature of the liquid at said point above that of the vapor lock.

If the radiator is above the heating zone, it will form its own vapor lock and the system will have characteristics similar to a conventional hot water heating system except that there will be a more rapid circulation of the liquid due to the far greater difference in density between a liquid and its vapor as compared with the difference in density of a liquid when hot and cool. The presence of dissolved or other vapors with greater vapor pressure than the liquid may cause vapor locks preventing circulation, which depends on the difference between the pressure due to a column of vapor whose height is equal to the total or combined height of all the bubbles of vapor, and the pressure due to a column of liquid of equal height.

In research work for the Army, the described system has been adapted to the heating of a casualty evacuation bag, which is in the nature of a sleeping bag used especially to keep wounded men warm when flying at high altitudes or when being transported in unheated ambulances or other conveyances. The radiator 7 for such a bag is preferably a coil of rubber or plastic tubing of about one-fourth to one-eighth inch in internal diameter, mounted on a cotton backing and enclosed within the layers of the body of the evacuation bag (not shown). When so enclosed it may have a spiral form or any other shape which will effect the desired heat distribution. Gases dissolved in the liquid will collect below the air escape 24 and may be bled off by opening the valve 25 from time to time. The air escape 24 is also a filling funnel for the liquid, and, if necessary, make-up or replacement liquid may be poured into the filling funnel. In an actual test, employing water boiling at 212° F. at atmospheric pressure, the radiator was relatively uniform in temperature due to the relatively rapid circulation of the liquid, the temperature at the inlet of the coil being about 145° F. and at the outlet being about 135° F. With less heat applied at the source, the temperature difference between the inlet and outlet of the radiator may be only seven or eight degrees F., with an average coil temperature of about 120° F.

Referring to Fig. 2, wherein a slightly different boiler arrangement is shown for use in the system of Fig. 1, the boiler 30 is shown as a closed vessel heated by a gas burner 31, having a baffle 32 extending vertically, with a liquid passageway or port 33 below the baffle and communicating with the second return pipe 11, the hot tube 6 rising vertically from a point to one side of the boiler and directly above the outlet of an inclined tube 34 which communicates at its upper end or inlet with the vapor space 35 within the boiler. The liquid 36 is maintained at a boiler level below the inlet of inclined tube 34. The vapor in space 35 is of course under pressure. As bubbles 37, 38, 39 are formed in the liquid by heat from source 31 they will rise to the surface of the liquid and break, and increase the vapor pressure, but soon or perhaps immediately a bubble 40 will form at the outlet of inclined tube 34 and will rise in the hot tube 6, carrying a liquid slug 41 upwardly with it. The vertical baffle 32 is so disposed as to insure the desired travel of the bubbles upwardly to the liquid surface and the desired building up of bubbles at the extreme lower end of the hot tube 6, in order to form a succession of liquid slugs to be moved upwardly by the bubbles.

As will be understood by those skilled in the art, many changes may be made in the described apparatus within the scope of the appended claims which define my invention.

What I claim is:

1. A phase change heat transfer system comprising a source of heat; a radiator; a conduit rising above the source of heat and discharging into the radiator; a vaporizable liquid in the system; said conduit being of such small dimensions laterally and the source of heat being of such capacity that the liquid will be vaporized to form vapor bubbles which fill the conduit from side to side and move upwardly in said conduit, said bubbles being preceded and followed by slugs of hot liquid which also move upwardly in the conduit; a return conduit coupled to the radiator for returning the cooled liquid from the radiator toward the source of heat; and a heat exchanger above the source of heat and including portions of both conduits, said heat exchanger being constructed and arranged to preheat the cooled liquid on its way back to the source of heat, said preheating being effected by heat derived from the rising slugs of hot liquid in the first-named conduit and the latent heat of vaporization of said bubbles, said bubbles being condensed in said heat exchanger; the entire system being substantially completely filled with the liquid and its vapor and normally being sealed off from the atmosphere.

2. The invention defined in claim 1, wherein the radiator is located on a level below the source of heat, and has an upwardly rising part constructed and arranged to provide a vapor lock.

3. The invention defined in claim 1, wherein the conduits and radiator are pipes or tubes of approximately one-fourth to one-eighth inch in internal diameter.

4. The invention defined in claim 1, wherein there is a boiler directly heated by the source of heat and connected with the cool liquid return conduit to receive cool liquid for reheating and also connected with the hot liquid conduit to deliver heated liquid thereto, a downwardly inclined tube being within the boiler and having its inlet in the vapor space of the boiler and its outlet below the liquid level of the boiler, said outlet being at the bottom end of the hot liquid conduit.

5. A phase change heat transfer system comprising a source of heat; a boiler directly heated by the source of heat and having a vapor space; a radiator; a hot liquid conduit coupled with the boiler and radiator; a cool liquid conduit connecting the radiator and boiler; a vaporizable liquid in the system; a downwardly inclined tube within the boiler and having its inlet in the vapor space of the boiler and having its outlet below the liquid level of the boiler and at the lower end of the hot liquid conduit; the source of heat being of such capacity and the hot liquid conduit being of such small diameter that the liquid in the boiler will be vaporized to form vapor bubbles which will be conveyed by said downwardly inclined tube to the lower end of the hot liquid conduit, said bubbles filling the hot liquid conduit from side to side and each bubble being preceded and followed by slugs of hot liquid which move upwardly in the hot liquid conduit with the bubbles; a heat exchanger above the source of heat and including portions of both conduits, said heat exchanger being constructed and arranged to preheat the cool liquid in the cool liquid conduit just before it returns to the boiler, said preheating being effected by heat derived from rising slugs of hot liquid and the latent heat of vaporization of said bubbles; the entire system being substantially completely filled with said vaporizable liquid and its vapor and normally being sealed off from the atmosphere; a vertical baffle being within the boiler and separating the inclined tube from the liquid-heating portion of the boiler.

References Cited in the file of this patent

UNITED STATES PATENTS

| 507,519 | Small | Oct. 24, 1893 |
| 912,527 | Batter | Feb. 16, 1909 |
| 1,650,874 | Lemarstre | Nov. 29, 1927 |
| 2,479,062 | Edel | Aug. 16, 1949 |
| 2,515,081 | Edel | July 11, 1950 |

FOREIGN PATENTS

| 396,739 | France | Apr. 19, 1909 |